(12) United States Patent
Kobres

(10) Patent No.: US 11,392,914 B2
(45) Date of Patent: Jul. 19, 2022

(54) TECHNIQUES FOR MOBILE TRANSACTION PROCESSING

(71) Applicant: NCR Corporation, Duluth, GA (US)

(72) Inventor: Erick C. Kobres, Lawrenceville, GA (US)

(73) Assignee: NCR Corporation, Atlanta, GA (US)

( * ) Notice: Subject to any disclaimer, the term of this patent is extended or adjusted under 35 U.S.C. 154(b) by 627 days.

(21) Appl. No.: 14/276,651

(22) Filed: May 13, 2014

(65) Prior Publication Data

US 2014/0249939 A1 Sep. 4, 2014

Related U.S. Application Data

(62) Division of application No. 13/285,371, filed on Oct. 31, 2011, now Pat. No. 8,738,540.

(51) Int. Cl.
| | |
|---|---|
| G06Q 20/18 | (2012.01) |
| G06Q 20/14 | (2012.01) |
| G06Q 20/12 | (2012.01) |
| G06Q 20/32 | (2012.01) |
| G06Q 20/38 | (2012.01) |
| G06Q 20/40 | (2012.01) |
| G06Q 30/06 | (2012.01) |
| G06Q 20/36 | (2012.01) |
| G06Q 20/02 | (2012.01) |

(52) U.S. Cl.
CPC .......... *G06Q 20/14* (2013.01); *G06Q 20/023* (2013.01); *G06Q 20/12* (2013.01); *G06Q 20/18* (2013.01); *G06Q 20/322* (2013.01); *G06Q 20/3276* (2013.01); *G06Q 20/367* (2013.01); *G06Q 20/382* (2013.01); *G06Q 20/40* (2013.01); *G06Q 20/401* (2013.01); *G06Q 30/0601* (2013.01)

(58) Field of Classification Search
None
See application file for complete search history.

(56) References Cited

U.S. PATENT DOCUMENTS

| | | | | |
|---|---|---|---|---|
| 7,618,318 | B2 * | 11/2009 | Ciancio .................. | G06Q 30/02 463/25 |
| 8,380,177 | B2 * | 2/2013 | Laracey ............. | G06Q 30/0253 370/259 |
| 8,528,067 | B2 * | 9/2013 | Hurry ................ | G06Q 20/3552 726/9 |
| 2008/0162292 | A1 * | 7/2008 | Roshandel .......... | G07F 17/0014 705/16 |
| 2012/0117181 | A1 * | 5/2012 | Patel ........................ | G06F 8/61 709/217 |

* cited by examiner

*Primary Examiner* — John W Hayes
*Assistant Examiner* — Zehra Raza
(74) *Attorney, Agent, or Firm* — Schwegman, Lundberg & Woessner

(57) ABSTRACT

Techniques for automated mobile transaction processing are provided. A consumer traverses to a web portal or other type of enterprise terminal device of an enterprise and proceeds to shop. During checkout, the portal contacts a transaction service and is delivered back an identifying barcode or Quick Response (QR) code. The consumer uses a mobile device to scan the code and send it to the transaction service. Previously registered payment details of the consumer are located and payment is received from the consumer. The portal is notified that payment is completed by the transaction service.

3 Claims, 4 Drawing Sheets

TECHNIQUES FOR MOBILE TRANSACTION PROCESSING

CROSS-REFERENCE TO RELATED APPLICATIONS

The present application is a divisional application and claims the benefit of the filing date of application Ser. No. 13/285,371, filed Oct. 31, 2011, entitled, "Techniques for Mobile Transaction Processing".

BACKGROUND

Consumers are increasingly using kiosks to conduct business with enterprises. The kiosks come in a variety of sizes and are used for a variety of purposes. Some kiosks are drive through, such as fast food establishments, pharmacies, banks, and the like. Other kiosks are stationary located in gas stations, airlines, grocery stores, department stores, and the like.

In addition, what is considered a kiosk is evolving with today's technology. For example, digital signs now provide advertisements and mechanisms for users to interact with the displays to perform transactions. Such mechanisms include blue tooth communication, Near Field Communication (NFC), Quick Response (QR) code scanning, WiFi communication, and the like.

So, increasingly customers are engaging in a variety of technologies to automatically interact with enterprises to perform transactions. The transactions may result in purchases or may result in such things as registration for loyalty programs, enrolling in promotional events, requesting additional information for a good or service, and others. That is, the transactions via these kiosks are not strictly tied to purchases although some transactions are purchase related.

One problem with the variety of existing mechanisms used to interact with customers is that often the customers are required to enter a variety of identifying information or other information before a transaction can conclude. For example, nearly all enterprise kiosks or website portal stores require the consumer to enter payment information, such as a bank account number or credit card number. This poses a security risk that some consumers do not want to engage in. It also slows down the transaction and if the consumer enters one wrong number for an account the whole transaction can be denied.

SUMMARY

In various embodiments, techniques for automated transactions with an enterprise are presented. According to an embodiment, a method for an automated transaction with an enterprise system is provided.

Specifically, a request is received to complete a transaction occurring between a consumer and an enterprise terminal device. Next, a unique token is provided back to the enterprise terminal device for uniquely identifying the transaction. Subsequently, a signed version of the unique token is received from the mobile device and the signed token is validated. Finally, the transaction is completed using payment details associated with the consumer.

DETAILED DESCRIPTION

Figure 1:
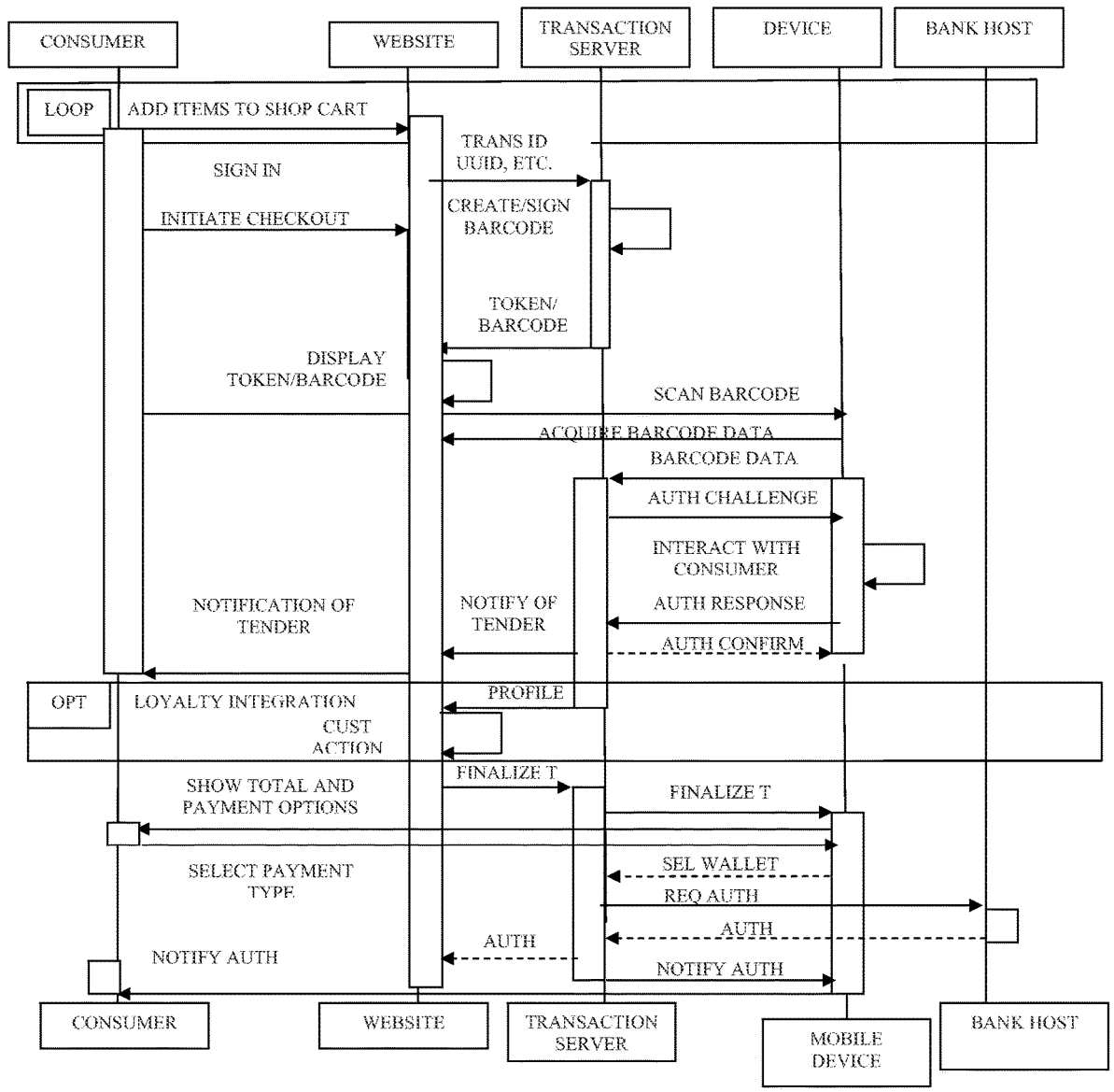
FIG. 1 is a flow diagram for mobile transaction processing, according to an example embodiment.

FIG. 1 is a flow diagram for mobile transaction processing, according to an example embodiment. The components of the diagram are implemented in non-transitory computer-readable storage medium for execution on one or more processing devices that are configured to execute the components. The components are also enabled to operate and communicate with one another over a network. The network can be wired, wireless, or a combination of wired and wireless.

It is noted that the components and the interactions of the components shown in the FIG. 1 are presented for illustrative purposes in a sample scenario with a sample enterprise system. So, other arrangements and interactions of the components are possible without departing from the beneficial teachings presented herein and below.

Various embodiments herein provide a mechanism to enable a consumer to present their payment and/or loyalty information online. A web shopping site presents a Two-Dimensional (2D) barcode to the consumer, who scans the barcode in with their mobile device, accomplishing the same end result as entering their credit card information. This also establishes a link between the consumer mobile device and the transaction—such that the mobile device can be used as the User Interface (UI) to allow the customer to answer questions, redeem points, pay, or transact other secure business on their mobile device in a "trusted" environment.

Referring to the FIG. 1, a consumer visits a commercial website with the intention of making a purchase; this can occur via a different device from a mobile device of the consumer or via the same mobile device.

The consumer uses the traditional web shopping model to add items to their cart and proceeds to checkout.

The business web application calls a mobile transaction web service with a transaction Identifier (ID), unique session ID, or other information necessary to conduct the transaction.

The Transaction System returns barcode and string data containing the portal Uniform Resource Locator (URL) and the unique transaction ID, digitally signed with the private key of the business.

The web site displays the barcode or string, such that the consumer's mobile device can acquire the string, via scanning it from the display or via an application that detects it on a page within the mobile device.

The web site calls the web service and blocks (waits on the transaction that is proceeding), awaiting payment confirmation: or the web site registers for notification once payment has been completed.

The consumer uses the retailer or mobile app to acquire the string via barcode or other technique.

The business or mobile app connects to the web service via secure connection, either through existing Over-The-Air (OTA) data connection, WiFi, SMS or other mechanism and presents the string.

Optionally, the consumer authenticates with the web service via their mobile device with a secret, such as a Personal Identification Number (PIN), secure element token, biometrics or other mechanism.

The consumer is presented with a transaction summary and total amount, previously returned from the mobile transaction service.

The consumer selects a payment method and confirms payment on the mobile device.

Payment is confirmed, and the mobile transaction service returns a payment confirmation authorization code and any other relevant information required to complete the transaction to the business web application.

Optionally, the mobile device may receive transaction updates, an electronic receipt or other information related to the transaction.

Figure 2:
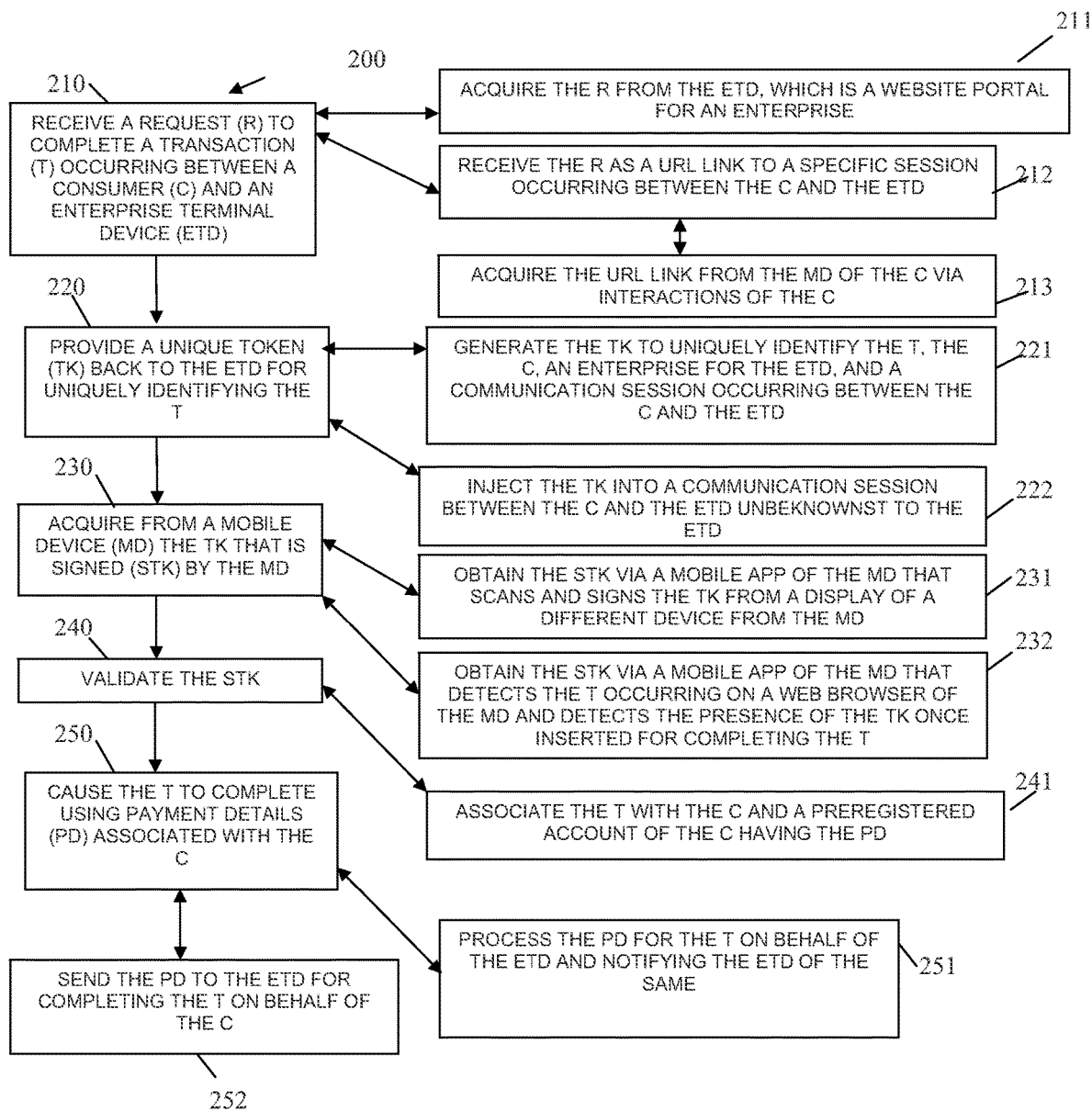
FIG. 2 is a diagram of a method for mobile transaction processing, according to an example embodiment.

FIG. 2 is a diagram of a method 200 for mobile transaction processing, according to an example embodiment. The method 200 (hereinafter "transaction service") is implemented as instructions programmed and residing on a non-transitory computer-readable (processor-readable) storage medium and executed by one or more processors. The processors are specifically configured and programmed to process the transaction service. The transaction service operates over a network. The network is wired, wireless, or a combination of wired and wireless.

The transaction service executes on one or more processors of a server. In some embodiments, the transaction service in a cloud processing environment and is available as a cloud service over the Internet to enterprises and consumers.

In other cases, the transaction service is controlled from a server of a specific enterprise offering mobile transaction processing.

So, the transaction service can be a third-party service offered to a plurality of enterprises or can be controlled and managed within a processing environment of a specific enterprise offering a specific mobile transaction processing. Both embodiments can occur simultaneously in the industry as well utilizing different instantiations of the transaction service. That is, for security reasons financial institutions may desire to manage their own version of the transaction service within their own controlled processing environment, where as retail establishments may opt for third-party outsourcing to utilize the transaction service.

The processing of the transaction service interacts with consumer mobile device apps, applications and services of enterprise systems, and/or other third-party services utilized by consumers and/or enterprises for transaction processing, loyalty processing, and/or other customer relationship management processing.

At 210, the transaction service receives a request to complete a transaction. The transaction occurring between a consumer and an enterprise terminal device (e.g., website, kiosk, and the like). Receipt of the request can occur in a variety of manners.

For example, at 211, the transaction service acquires the request from the enterprise terminal device (or application processing thereon), where the enterprise terminal device is a website portal for an enterprise and the transaction is the completion of a shopping session with a consumer on that website and the shopping cart of the consumer includes one or more goods or services purchased from the enterprise.

In another case, at 212, the transaction service receives the request as an URL link to a specific session that is occurring between the consumer and the enterpriser terminal device.

Continuing with the embodiment of 212 and at 213, the transaction service acquires the URL link from the mobile device of the consumer via interactions of the consumer. In other words, the consumer sends the URL via a mobile device to the transaction service and provides with the URL the specific session that the consumer is engaged in with the enterprise terminal device.

At 220, the transaction service provides a unique token back to the enterprise terminal device for uniquely identifying the transaction. This token can include a variety of information (discussed above with reference to the FIG. 1). The token permits the session for the transaction to be identified, the transaction to be identified, the consumer to be identified, and the enterprise or enterprise terminal device to be identified. In an embodiment, the token is a barcode or a Quick Response (QR) code.

In an embodiment, at 221, the transaction service generates the unique token to identify the token, the consumer, the enterprise for the transaction, and a communication session occurring between the consumer and the enterprise terminal device.

At 230, the transaction service acquires from the mobile device the token. The token is now signed by the mobile device.

According to an embodiment, at 231, the transaction service obtains the signed token via a mobile app of the mobile device that scans and signs the token from a display of a different device from that which is associated with the mobile device.

In another case, at 232, the transaction service obtains the signed token via a mobile app of the mobile device that detects the transaction occurring on a web browser of the mobile device and detects the presence of the token once interested for completing the transaction.

At 240, the transaction service validates the signed token returned from the mobile device.

In an embodiment, at 241, the transaction service associates the token with the consumer and a preregistered account of the consumer having the payment details.

At 250, the transaction service causes the transaction to complete using the payment details associated with the consumer.

In this way, the consumer does not have to enter the payment details to complete a transaction.

According to an embodiment, at 251, the transaction service processes the payment details for the transaction on behalf of the enterprise terminal device and notifying the enterprise terminal device of the same.

In another situation, at 252, the transaction service sends the payment details to the enterprise terminal device for completing the transaction on behalf of the consumer.

Figure 3:
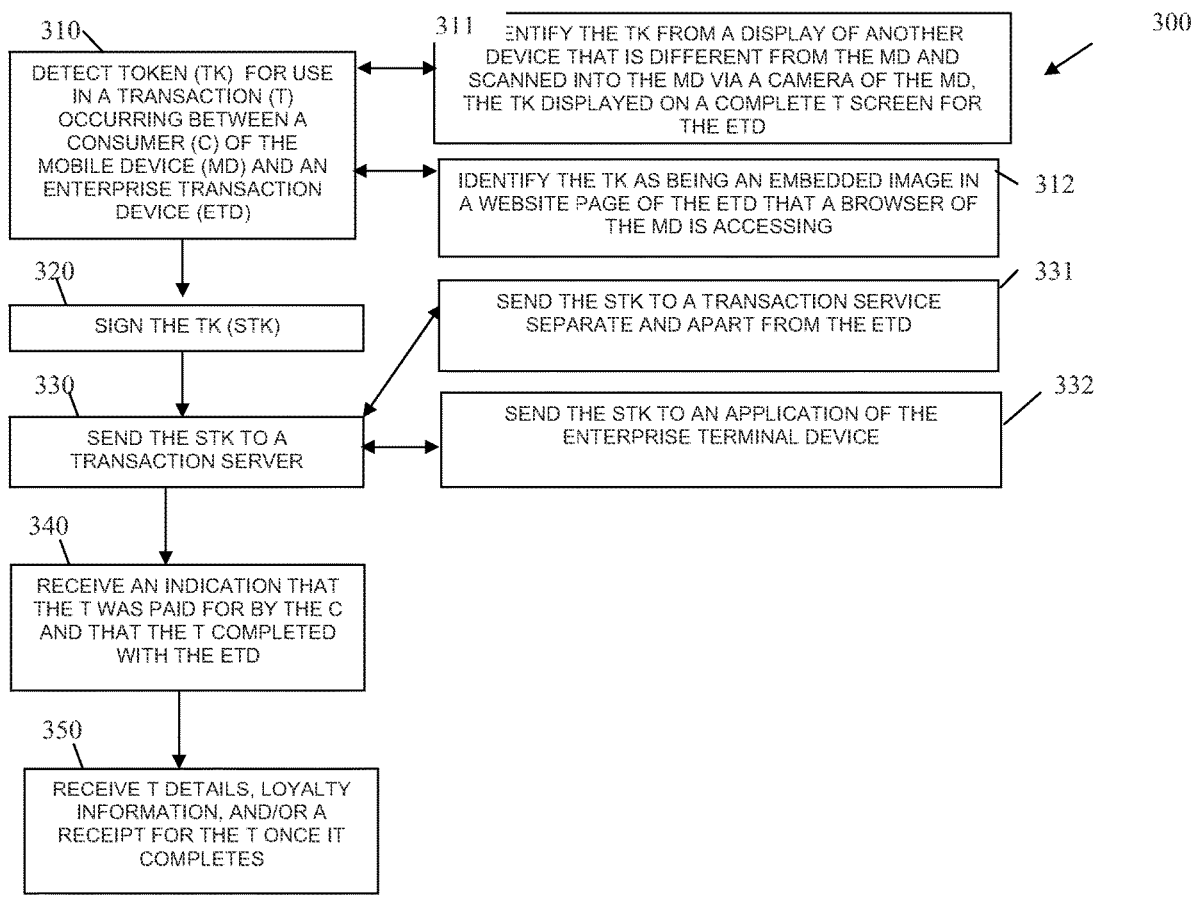
FIG. 3 is a diagram of another method for mobile transaction processing, according to an example embodiment.

FIG. 3 is a diagram of another method 300 for mobile transaction processing, according to an example embodiment. The method 300 (hereinafter "mobile app") is implemented as instruction and programmed within a non-transitory computer-readable (processor-readable) storage medium that executes on one or more processors of a mobile device (e.g., mobile phone, personal digital assistant (PDA), tablet, laptop, etc.); the processors of the mobile device are specifically configured to execute the mobile app. The mobile app is operational over a network; the network is wired, wireless, or a combination of wired and wireless.

The mobile app is controlled by a consumer (customer and/or user) and interacts with the transaction service, represented by the method 200 of the FIG. 2 and also interacts with an enterprise terminal device (discussed below with reference to the FIG. 4).

It is noted that the mobile app can be installed and initiated by the consumer on the mobile device in a variety of manners before the processing occurs as detailed below. For instance, in one situation during a registration process of the mobile device with a transaction service (such as the one discussed above with reference to the FIG. 2), the mobile app is downloaded and initiated on the mobile device, hi another instance, during an initial contact by the mobile device with an enterprise terminal device of an enterprise, the customer is directed to a website of the enrollment service (discussed above with reference to the FIG. 2) where the registration process occurs and the mobile app is downloaded and initiated on the mobile device.

Other situations can result in the mobile app's installation as well. For instance, as part of a registration process in a loyalty program with a specific enterprise, the consumer may agree to engage the transaction service features. This may result in the enterprise's registration service in contacting the transaction service with details expected by the transaction service (as discussed above) on behalf of the consumer, and at some later point result in the transaction service dynamically pushing the mobile app for initiating on the mobile device of the consumer.

At 310, the mobile app detects a token for user in a transaction. The transaction occurring between a consumer of a mobile device and an enterprise, via an enterprise transaction device.

In an embodiment, at 311, the mobile app identifies the token from a display of another device that is different from the mobile device and the token is scanned into the mobile device via a camera of the mobile device. The token displayed on a complete transaction screen for the enterprise terminal device.

In another situation, at 312, the mobile app identifies the token as being embedded as an image in a website page of the enterprise terminal device that the browser of the mobile device is accessing.

At 320, the mobile app signs the token.

At 331, the mobile app sends the signed token to a transaction server (such as the transaction service represented by the FIG. 2 above). The transaction service is separate and apart from the enterprise terminal device.

In another case, at 332, the mobile app sends the signed token to an application of the enterprise terminal device.

At 340, the mobile app receives an indication that the transaction was paid for by the consumer and that the transaction completed with the enterprise terminal device.

According to an embodiment, at 350, the mobile app receives transaction details, loyalty information, and/or an electronic receipt for the transaction once it completes.

Figure 4:
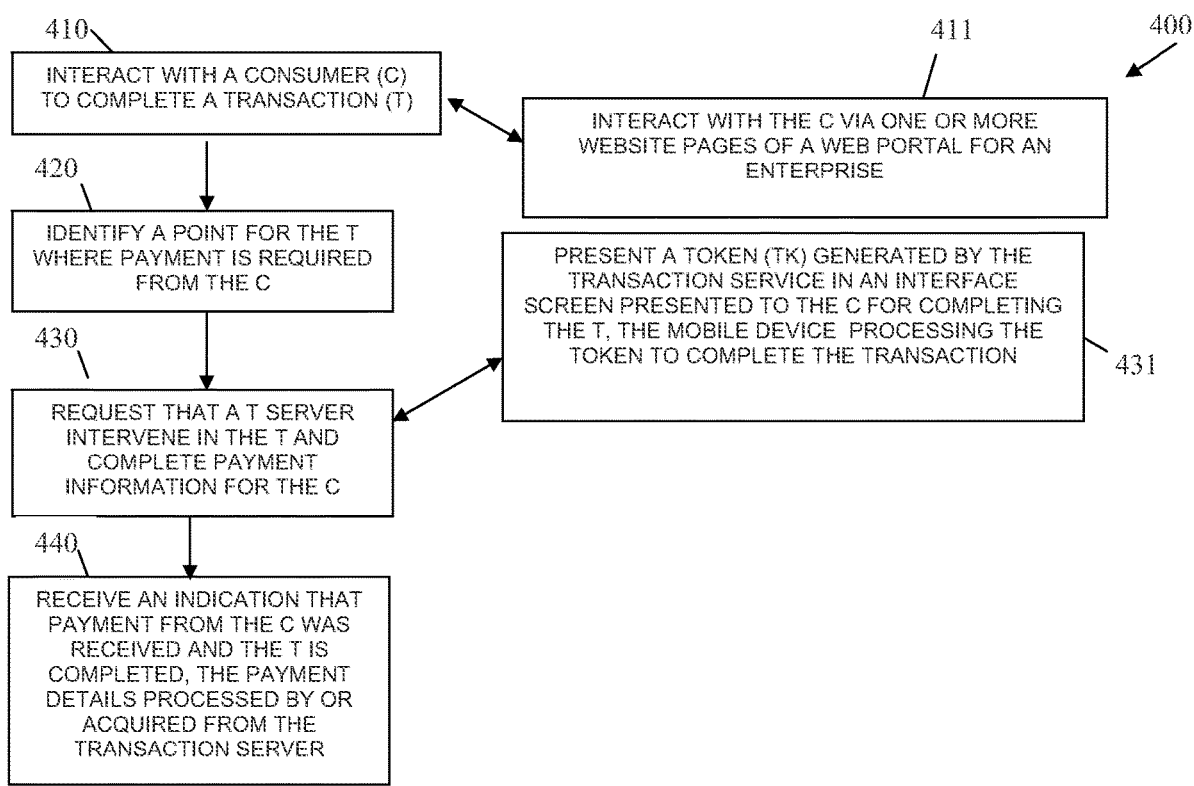
FIG. 4 is a diagram of yet another method for mobile transaction processing, according to an example embodiment.

FIG. 4 is a diagram of yet another method 400 for mobile transaction processing, according to an example embodiment. The method 300 (hereinafter "enterprise terminal app") is implemented as executable instructions and programmed within a non-transitory computer-readable (processor-readable) storage medium that executes on one or more processors of an enterprise terminal (e.g., cashier-manned device, self-service kiosk, digital sign, website of a retail, etc.); the processors of the enterprise terminal app are specifically configured to execute the enterprise terminal app. The enterprise terminal app is operational over a network; the network is wired, wireless, or a combination of wired and wireless.

The FIG. 1 described the processing for automating transaction processing of a consumer and/or a consumer's mobile device as a whole. The FIG. 2 described the processing from the perspective of the remote and server/cloud based transaction service; the FIG. 3 described the processing from the perspective of the consumer's mobile app on a consumer's mobile device; and the enterprise terminal app of the FIG. 4 describes the processing from an enterprise's transaction system processing on a retail terminal device. A consumer transaction for a retail terminal device is automated via the interaction among the transaction service (of the FIG. 2), the mobile app (of the FIG. 3), and the enterprise terminal app (of the FIG. 4).

At 410, the enterprise terminal app interacts with a consumer to complete a transaction.

According to an embodiment, at 411, the enterprise terminal app interacts with the consumer via one or more website pages of a web portal for an enterprise. The web portal or site being viewed as an enterprise terminal device.

At 420, the enterprise terminal app, identifies a point for the transaction where payment is required from the consumer.

At 430, the enterprise terminal app requests that a transaction server intervene in the transaction and complete payment for the consumer. This can occur out-of-band with the consumer, such as via transactions occurring via a mobile device of the consumer as presented above with respect to the FIGS. 1-3.

In an embodiment, at 431, the enterprise terminal app presents a token generated by the transaction service in an interface screen presented to the consumer for completing the transaction. The mobile device processes the token to complete the transaction.

At 440, the enterprise terminal app receives an indication that payment from the consumer was received and the transaction is completed. The payment details processed by or acquired from the transaction server.

The above description is illustrative, and not restrictive. Many other embodiments will be apparent to those of skill in the art upon reviewing the above description. The scope of embodiments should therefore be determined with reference to the appended claims, along with the full scope of equivalents to which such claims are entitled.

The Abstract is provided to comply with 37 C.F.R. § 1.72(b) and will allow the reader to quickly ascertain the nature and gist of the technical disclosure. It is submitted with the understanding that it will not be used to interpret or limit the scope or meaning of the claims.

In the foregoing description of the embodiments, various features are grouped together in a single embodiment for the purpose of streamlining the disclosure. This method of disclosure is not to be interpreted as reflecting that the claimed embodiments have more features than are expressly recited in each claim. Rather, as the following claims reflect, inventive subject matter lies in less than all features of a single disclosed embodiment. Thus the following claims are hereby incorporated into the Description of the Embodiments, with each claim standing on its own as a separate exemplary embodiment.

The invention claimed is:

1. A method, comprising:
  registering, by a registration service of a retailer, a consumer with a loyalty program of the retailer;
  obtaining, by the registration service, permission from the consumer during the registering for engaging transaction features of a transaction sever;
  providing, by the registration service, details of an account of the consumer with the retailer to the transaction server based on the obtaining, wherein the account is maintained as a preregistered account by the transaction server;

providing, by a transaction server, a mobile application, to a mobile device of the consumer for the consumer to interact with the transaction server and a retail terminal device of the retailer;

communicating between the retail terminal device of the retailer and the mobile device of the consumer using the mobile application of the mobile device, wherein communicating further includes initiating a transaction that is initiated by the consumer through the mobile application;

identifying, by the retail terminal device, a processing point for the transaction where a payment is required from the consumer for proceeding with the transaction;

sending, by the mobile application, a request for payment processing of the payment along with a Uniform Resource Locator (URL) link to a session between the retail terminal device and the mobile device for the transaction to the transaction server;

acquiring, by the transaction server, the request for payment processing of the payment and the URL link for the session;

generating, by the transaction server, a token identifying the consumer, the session, and the retailer;

providing, by the transaction server, the token to the retail terminal device;

displaying, by the retail terminal device, the token;

scanning, by the mobile application of the mobile device, the token from the retail terminal device;

signing, by the mobile application of the mobile device, the token;

providing, by the mobile application of the mobile device, the token that is signed to the transaction server;

receiving, by the transaction server, the token that is signed from the mobile application of the mobile device;

validating, by the transaction server, that the token is signed and received from the mobile device;

associating, by the transaction server, the token with the transaction, the consumer and the preregistered account of the consumer, the payment, and the retail terminal device, wherein the preregistered account comprising payment details;

processing, by the transaction server, the payment details completing payment for the transaction;

providing, by the transaction server, an indication to the retail terminal device indicating that the payment was processed for the transaction; and receiving, by the retail terminal device, the indication.

2. The method of claim 1, wherein communicating further includes communicating with the consumer through one or more website pages of a web portal for an enterprise associated with the retail terminal device.

3. The method of claim 1, wherein the retail terminal device is a kiosk.

* * * * *